Sept. 1, 1959  G. A. LYON  2,902,318
WHEEL COVER
Filed Jan. 26, 1956  2 Sheets-Sheet 1
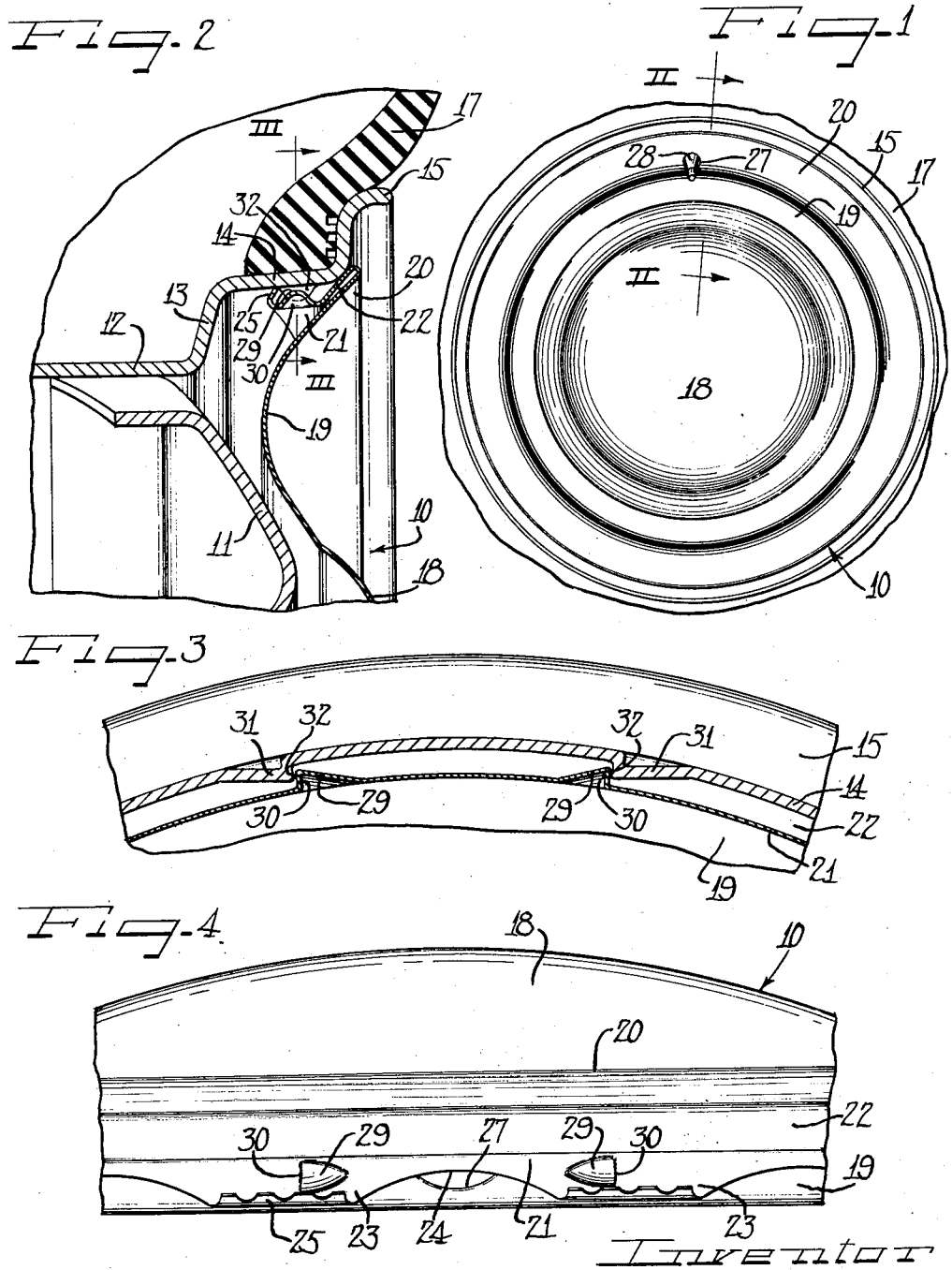
Inventor
George Albert Lyon

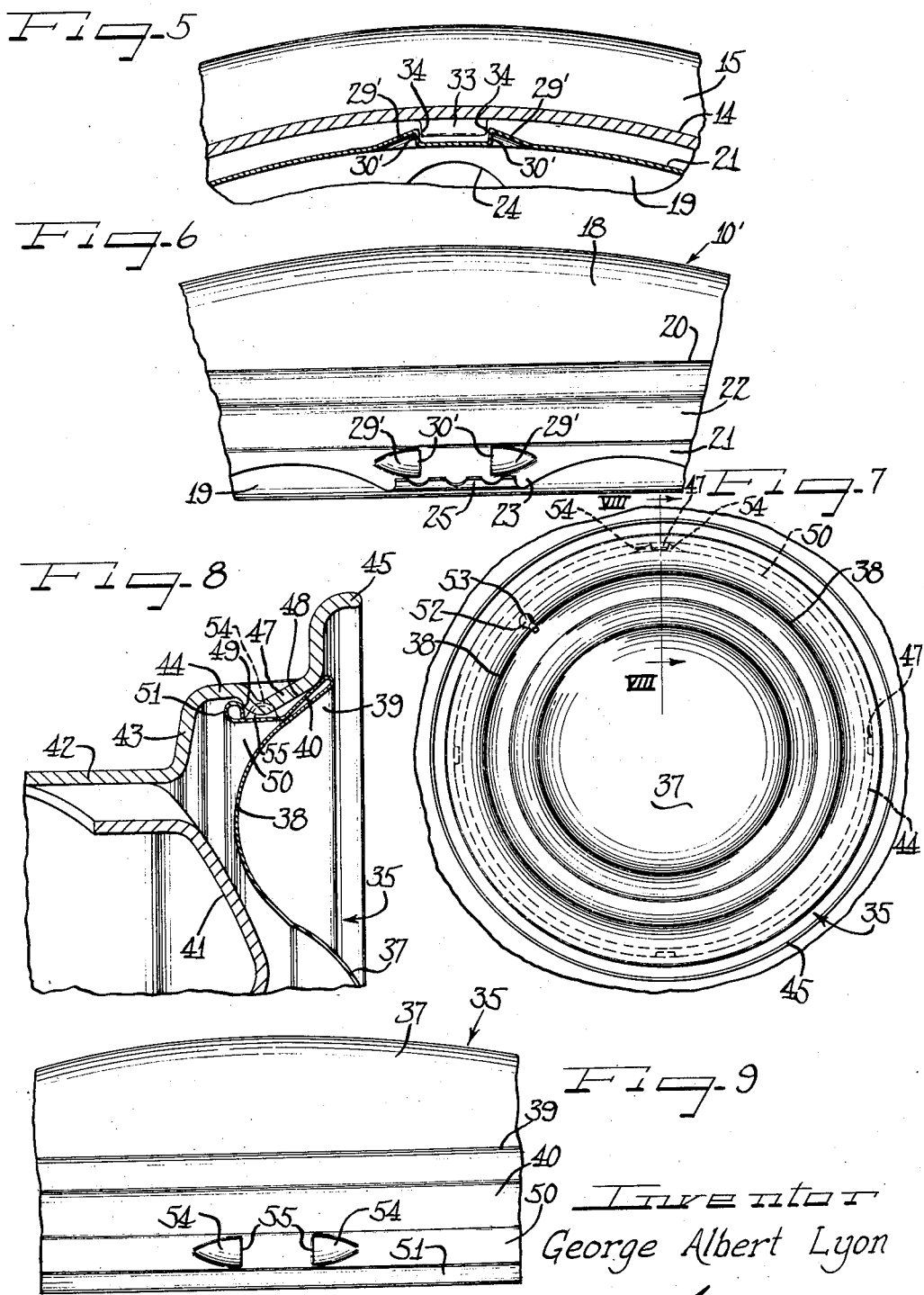

United States Patent Office 2,902,318
Patented Sept. 1, 1959

2,902,318

WHEEL COVER

George Albert Lyon, Detroit, Mich.

Application January 26, 1956, Serial No. 561,574

5 Claims. (Cl. 301—37)

The present invention relates to improvements in wheel structures and more particularly concerns improvements in the cooperative relationship between vehicle wheels and ornamental and protective covers therefor.

It is an object of the present invention to provide improved means for holding wheel covers against turning on the wheel, whereby to maintain positive alignment of a valve stem on the wheel and the opening provided in the cover for projection therethrough of the valve stem and thereby avoid the possibility of the cover turning or creeping on the wheel responsive to torque stresses in service and consequent twisting or tearing of the valve stem.

Another object of the invention is to provide improved cooperative means on a tire rim and a wheel cover for positively holding the cover against turning relative to the wheel.

A further object of the invention is to provide in a self retaining wheel cover novel retaining means in association with the cover retaining means for holding the cover against torque induced turning of the cover on the wheel.

Still another object of the invention is to provide in a wheel cover pressed out turn-preventing means which instead of weakening the portion of the cover from which pressed out, such as retaining flange structure on the cover, actually reenforces and strengthens such portion in the vicinity of the press out of the turn preventing means.

Other objects, features and advantages of the present invention will be readily apparent from the following detailed description of certain preferred embodiments thereof taken in conjunction with the accompanying drawings in which:

Figure 1 is a side elevational view of a wheel structure embodying features of the invention;

Figure 2 is a fragmentary radial sectional detail view on an enlarged scale taken substantially on the line II—II of Figure 1;

Figure 3 is a fragmentary sectional detail view taken substantially on the line III—III of Figure 2;

Figure 4 is a fragmentary side or edge elevational view of the cover of Figures 1 and 2 showing the turn-preventing embossments in the cover retaining flange structure;

Figure 5 is a fragmentary sectional detail view similar to Figure 3 but showing a modification;

Figure 6 is a fragmentary side or edge elevational view of the cover of Figure 5 showing the modified turn-preventing embossments on the cover retaining flange structure of the cover;

Figure 7 is an outer side elevational view of a wheel structure showing a further modification;

Figure 8 is an enlarged fragmentary radial sectional view taken substantially on the line VIII—VIII of Figure 7; and Figure 9 is a fragmentary side or edge elevational view of the cover of Figure 8 showing the turn-preventing embossments on the retaining flange structure thereof.

In Figures 1 through 4 is shown a wheel cover 10 which is constructed and arranged for disposition in covering and ornamental relation at the outer side of a vehicle wheel of the disk spider type including a wheel body 11 supporting a drop center tire rim including a base flange 12, a side flange 13, an intermediate generally radially and axially outwardly extending and generally radially inwardly facing flange 14 which merges with a terminal flange 15. Supported by the tire rim is a pneumatic tire 17.

Herein the wheel cover 10 is of the full disk type including a central crown portion 18 for overlying the central portion of the wheel body 11, and joined to an intermediate annular inwardly dished cover portion 19 at the radially outer side of which is a generally radially and axially outwardly directed annular marginal portion 20. The marginal portion is adapted to extend into overlying relation to the tire rim and more particularly the radially inner portion of the terminal flange 15 and has therebehind cover retaining means. In the present instance, the cover retaining means comprises a generally axially inwardly extending continuous annular flange 21 herein comprising an extension from an underturned marginal flange 22 behind the marginal portion 20 of the cover. The diameter of the flange 21 is somewhat smaller than the diameter of the axially outer portion of the intermediate flange 14 of the tire rim so as to be disposable in spaced generally telescoped relation within the intermediate flange.

Projecting generally axially inwardly as integral extensions from the flange 21 is a series of circumferentially spaced cover retaining finger extensions 23 separated by generally arcuate cutouts 24 and provided at their inner extremities with short and stiff generally radially and axially outwardly oblique cover retaining terminal flanges 25. The edge extremities of the terminals 25 are engageable in press-on, pry-off relation with the inner face of the intermediate flange 14. Normally the tips of the terminals 25 extend to a larger diameter than the intermediate flange 14 and more particularly a central annular portion of the intermediate flange so that the cover is adapted to be pressed axially inwardly into position on the wheel with the retaining finger terminals 25 uniformly compressed or contracted radially inwardly by resilient deflection of the retaining fingers 23 and thereby substantial tensioning of the fingers and the continuous axial flange 21 for thereby causing the tips of the retaining terminals 25 to engage the intermediate flange with a firm cover retaining gripping action. In prying the cover from the wheel the pry-off tool is placed behind the outer margin of the cover and levered to slide the fingers out of gripping engagement with the terminal flange, In mounting the cover 10 upon the wheel, a valve hole 27 in the intermediate cover portion 19 is centered with respect to a valve stem 28 that projects from the side flange 13 of the tire rim and extends through the valve hole 27. Unusual torque stresses or forces in service tend to cause the wheel cover 10 to turn on the wheel and thus twist and possibly damage the valve stem 28.

According to the present invention, turning of the cover 10 relative to the wheel is positively precluded by the provision of improved interengageable shoulder means on the wheel cover and on the wheel. To this end, the cover retaining flange 21 is provided with a pair of shoulder embossments 29 which are preferably formed in the flange 21 equally spaced from but adjacent to the valve hole 27. As shown, the shoulder embossments 29 are of generally conoidal form pressed radially outwardly in the flange 21 adjacent to and if necessary partially in a pair of the retaining finger extensions 23 and with the point end portions of the embossments directed toward one another while abrupt shoulders 30 defining the opposite circumferentially directed ends of the embossments extend generally radially relative to the flange 21. Since the embossments 29 are formed without rupturing the material of the flange 21 and in the formation of the embossments 29 the material thereof is substantially work hardened it will be apparent that the embossments effect reenforcement for the flange and the adjacent retaining fingers 23 rather than weakening the flange or the fingers.

For turn-preventing cooperation with the shoulder walls 30 of the embossments 29, the tire rim intermediate flange 14 is provided with complementary generally radially inwardly pressed and directed circumferentially spaced embossments 31 that are provided with spaced opposed abrupt shoulders 32 that are respectively engageable with the abrupt turn-preventing embossment shoulders 30 of the wheel cover, substantially as shown in Figure 3. By preference the spacing between the wheel abutment shoulders 32 is just slightly greater than the spacing between the opposing faces of the cover abutment shoulders 30 to afford adequate tolerance and thereby assure unrestricted placement of the shoulder embossments 29 between the wheel embossments 31 incident to mounting the cover on the wheel.

Inasmuch as the respective opposed projection or embossment shoulder walls 30 and 32 are abrupt with relation to the embossments and complementary, there is no danger of the same riding over one another even in response to the most severe torque strains that may be imposed on the cover in service.

Moreover, since the cover embossments 29 are oriented relative to the valve stem aperture 27, and the embossments 31 on the tire rim are also similarly oriented to the valve stem 28 or the aperture through which the valve stem extends or in which it is secured, registration of the turn-preventing embossments 29 between the wheel embossments 31 is effected simply by registration of the valve stem 28 through the valve stem opening 27 incident to applying the cover to the wheel.

In the modification of Figures 5 and 6 the cover and wheel may be substantially the same as just described and to the extent of similarity the several elements thereof are identified by the same reference numerals. However, in this modification, the cover 10' is provided with a pair of turn-preventing embossments 29' which have abrupt shoulders 31 thereof in directly opposed spaced relation providing a predetermined space therebetween which is just slightly greater than the space between circumferentially opposite sides of a single embossment 33 in the intermediate flange 14 of the tire rim projecting generally radially inwardly and providing opposite circumferentially directed abrupt end shoulders 34 that oppose the respective cover embossment shoulders 30'. By preference, the embossments 29' and the abutment shoulder embossment 33 are generally aligned with the respective valve stem apertures in the cover and in the tire rim. Thus, in applying the cover 10' to the wheel the turn-preventing wheel embossment 33 is received between the opposed shoulders 30' of the cover turn-preventing embossments.

In Figures 7, 8 and 9 a similar cover and wheel arrangement is disclosed but the cover is provided with a modified form of cover retaining means. In this modification, therefore, a cover 35 having a crown 37, an intermediate annular dished portion 38 and a marginal portion 39 having an underturned and a radially and an axially inwardly extending flange 40 is adapted to be disposed at the outer side of a wheel including a wheel body 41 and a tire rim having, in addition to a base flange 42 and a side flange 43, an intermediate generally radially and axially outwardly sloping and radially inwardly facing annular flange 44 merging with a terminal flange 45. The intermediate flange 44 of the tire rim has at suitable intervals such as 4 as shown in Figure 7 generally radially inwardly directed retaining bump embossments 47 provided with generally radially and axially inwardly sloping lead-in surfaces 48 merging with respective generally undercut and generally radially and axially inwardly facing retaining shoulders 49.

For retaining engagement with the retaining bumps 47, the cover margin has therebehind as an axially inward continuous annular extension from the underturned flange 40 a cover retaining flange 50 which is of a diameter to telescope freely within the circle defined about the tips or nose projections of the retaining bumps 47 and is provided with an annular continuous outturned resilient bump engaging bead 51. It will be observed that the bead 51 is constructed and arranged to engage under resilient gripping tensioned relation with the bump shoulders 49 to thereby draw the underturned flange 40 tightly against the shoulder at juncture of the intermediate and terminal flanges 44 and 45 of the tire rim.

For retaining the cover 35 against turning relative to the wheel and to thus hold the cover against twisting a valve stem 52 that projects through a valve opening or hole 53 in the intermediate cover portion 38, the cover flange 50 is provided with a pair of opposed, spaced cover retaining embossments 54 which are preferably much the same as the cover embossments 29 hereinabove described, and with the opposing ends of the embossments provided with abrupt shoulders 55 that are as nearly as practicable in radial planes with respect to the center of the cover, or even substantially parallel to one another and facing circumferentially on the cover retaining flange 50 in proper location to receive therebetween one of the retaining bumps 47. Thereby the retaining embossment shoulders 55 are engageable with the respective opposite circumferential sides of the bump 47 located therebetween for thereby holding the cover against turning on the wheel. The cover turn-preventing embossments 54 are pressed from the flange 50 intermediate the terminal portion 51 thereof and the connection of the flange 50 to the cover in such a manner as to afford reenforcements for the flange rather than weakening thereof, similarly as the turn-preventing embossments 29 and 29' described hereinbefore reenforce the cover flange 21.

It will be understood that modifications and variations may be effected without departing from the scope of the novel concepts of the present invention.

I claim as my invention:

1. In a wheel structure including a generally axially extending annular radially facing portion having radially projecting structure thereon intermediate its axially inner and outer ends provided with oppositely circumferentially facing abrupt shoulders, a cover for disposition at the outer side of the wheel and generally over said portion, the cover having therebehind a generally axially inwardly extending cover retaining sheet metal flange which is connected at its axially outer end to the cover and has the axially inner end portion thereof resiliently radially flexibly related to the cover and provided with a cover retaining terminal retainingly engageable with said radially facing annular wheel portion axially inwardly relative to said projecting structure, said flange having in addition to said terminal structure integrally in one piece therewith and projecting radially from the flange intermediate said retaining terminal and said axially outer connected end of the flange unbroken solid embossed lug structure having respective oppositely circumferentially facing generally radially extending wall portions providing abrupt shoulders generally complementary to and engageable with said shoulders on said annular wheel portion for holding the cover against turning, said embossed structure being work hardened and providing reenforcement for and strengthening the retaining flange.

2. A wheel structure as defined in claim 1 wherein said abrupt shoulder walls facing away from one another and the opposing wheel portion shoulders are spaced apart and face toward one another with said shoulder walls disposed therebetween.

3. A wheel structure as defined in claim 1 wherein said abrupt shoulder walls face toward one another in spaced relation and the opposing shoulders on the annular wheel portion are disposed on and are part of a radially projecting lug member on the annular wheel portion.

4. A wheel structure as defined in claim 3 wherein the lug on the annular wheel portion is a retaining bump also having a generally axially inwardly facing shoulder engageable by the cover retaining terminal.

5. In a cover for disposition at the outer side of a vehicle wheel, a circular cover body having extending generally axially inwardly therefrom a retaining flange structure, having at the axially inner terminus thereof retaining terminal structure engageable with a portion of a wheel for retaining the cover mounted thereon, said flange having intermediate the terminal structure and the opposite end of the flange structure and in addition to said terminal structure a generally circumferentially elongated shoulder embossment providing an abrupt generally radially extending shoulder wall facing generally circumferentially for engagement with a complementary shoulder on the wheel portion with which the retaining terminal is engageable, for holding the cover against turning in one circumferential direction on the wheel and providing reinforcement for and strengthening the retaining flange structure.

References Cited in the file of this patent

UNITED STATES PATENTS

| | | |
|---|---|---|
| 2,624,640 | Lyon | Jan. 6, 1953 |
| 2,631,066 | Horn | Mar. 10, 1953 |
| 2,660,479 | Lyon | Nov. 24, 1953 |
| 2,669,487 | Horn | Feb. 16, 1954 |
| 2,733,104 | Lyon | Jan. 31, 1956 |
| 2,804,346 | Landell | Aug. 27, 1957 |